(12) United States Patent
Lingafelt et al.

(10) Patent No.: US 12,256,120 B2
(45) Date of Patent: Mar. 18, 2025

(54) CLOSED CAPTION CONTENT GENERATION

(71) Applicant: International Business Machines Corporation, Armonk, NY (US)

(72) Inventors: Charles Steven Lingafelt, Durham, NC (US); Gina Renee Howard, Hillsborough, NC (US); John E. Moore, Jr., Pflugerville, TX (US); Andrew R. Jones, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/487,597

(22) Filed: Sep. 28, 2021

(65) Prior Publication Data

US 2023/0103102 A1    Mar. 30, 2023

(51) Int. Cl.
| | | |
|---|---|---|
| *H04N 21/439* | (2011.01) | |
| *G10L 15/26* | (2006.01) | |
| *H04N 21/4402* | (2011.01) | |
| *H04N 21/488* | (2011.01) | |

(52) U.S. Cl.
CPC ......... *H04N 21/4394* (2013.01); *G10L 15/26* (2013.01); *H04N 21/440236* (2013.01); *H04N 21/4884* (2013.01)

(58) Field of Classification Search
CPC ....... H04N 21/4394; H04N 21/440236; H04N 21/4884; G10L 15/26
See application file for complete search history.

(56) References Cited

U.S. PATENT DOCUMENTS

| | | | | |
|---|---|---|---|---|
| 5,649,060 A | * | 7/1997 | Ellozy | G11B 27/10 704/235 |
| 8,554,558 B2 | | 10/2013 | McCarley | |
| 2003/0033347 A1 | | 2/2003 | Bolle | |
| 2005/0203750 A1 | | 9/2005 | Miyamoto | |
| 2015/0003797 A1 | | 1/2015 | Schmidt | |

(Continued)

OTHER PUBLICATIONS

Martone, et al., "Automated closed-captioning using text alignment." 9 pages. Storage and Retrieval Methods and Applications for Multimedia 2004. vol. 5307. International Society for Optics and Photonics, 2003.

(Continued)

*Primary Examiner* — Yassin Alata
(74) *Attorney, Agent, or Firm* — Heather Johnston

(57) ABSTRACT

A system may include a memory and a processor in communication therewith configured to perform operations. The operations may include receiving an audio file and a text file related to the audio file, analyzing the audio file to produce an analysis, and determining a portion of the audio file is similar to a segment of the text file. The operations may include identifying a first terminal signal and corresponding the first terminal signal to a first terminal tag in the text file such that the first terminal tag is aligned with the first terminal signal; the first terminal signal identifies a first portion terminal end of the portion and the first terminal tag identifies a first segment terminal end of the segment. The operations may include generating a converted text from the analysis and inserting the segment into the converted text.

20 Claims, 8 Drawing Sheets

(56) References Cited

U.S. PATENT DOCUMENTS

| | | | |
|---|---|---|---|
| 2015/0331941 A1* | 11/2015 | Defouw | H04N 21/8106 |
| | | | 707/687 |
| 2015/0371665 A1 | 12/2015 | Naik | |
| 2018/0132011 A1 | 5/2018 | Shichman | |
| 2019/0057701 A1* | 2/2019 | Kim | G10L 15/30 |
| 2019/0096407 A1 | 3/2019 | Lambourne | |
| 2021/0136459 A1* | 5/2021 | Mathur | G06V 10/764 |
| 2021/0142789 A1* | 5/2021 | Gurbani | G10L 15/16 |
| 2022/0005477 A1* | 1/2022 | Ma | H04N 21/234336 |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

\* cited by examiner

CLOSED CAPTION CONTENT GENERATION

BACKGROUND

The present disclosure relates to text generation and more specifically to closed caption content generation.

Closed captioning of video programming helps ensure access to such programming to the deaf or hard of hearing. Closed captioning may be embedded in television and/or other broadcast signals and can be made visible when using a closed captioning decoder; the closed captioning decoder may be a separate appliance or built into a viewscreen.

SUMMARY

Embodiments of the present disclosure include a system, method, and computer program product for closed caption content generation.

A system in accordance with the present disclosure may include a memory and a processor in communication with the memory. The processor may be configured to perform operations. The operations may include receiving an audio file and a text file related to the audio file, analyzing the audio file to produce an analysis, and determining a portion of the audio file is similar to a segment of the text file. The operations may include identifying a first terminal signal, wherein the first terminal signal identifies a first portion terminal end of the portion, corresponding the first terminal signal to a first terminal tag in the text file, wherein the first terminal tag identifies a first segment terminal end of the segment, generating a converted text from the analysis, and inserting the segment into the converted text, wherein the first terminal tag is aligned with the first terminal signal.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
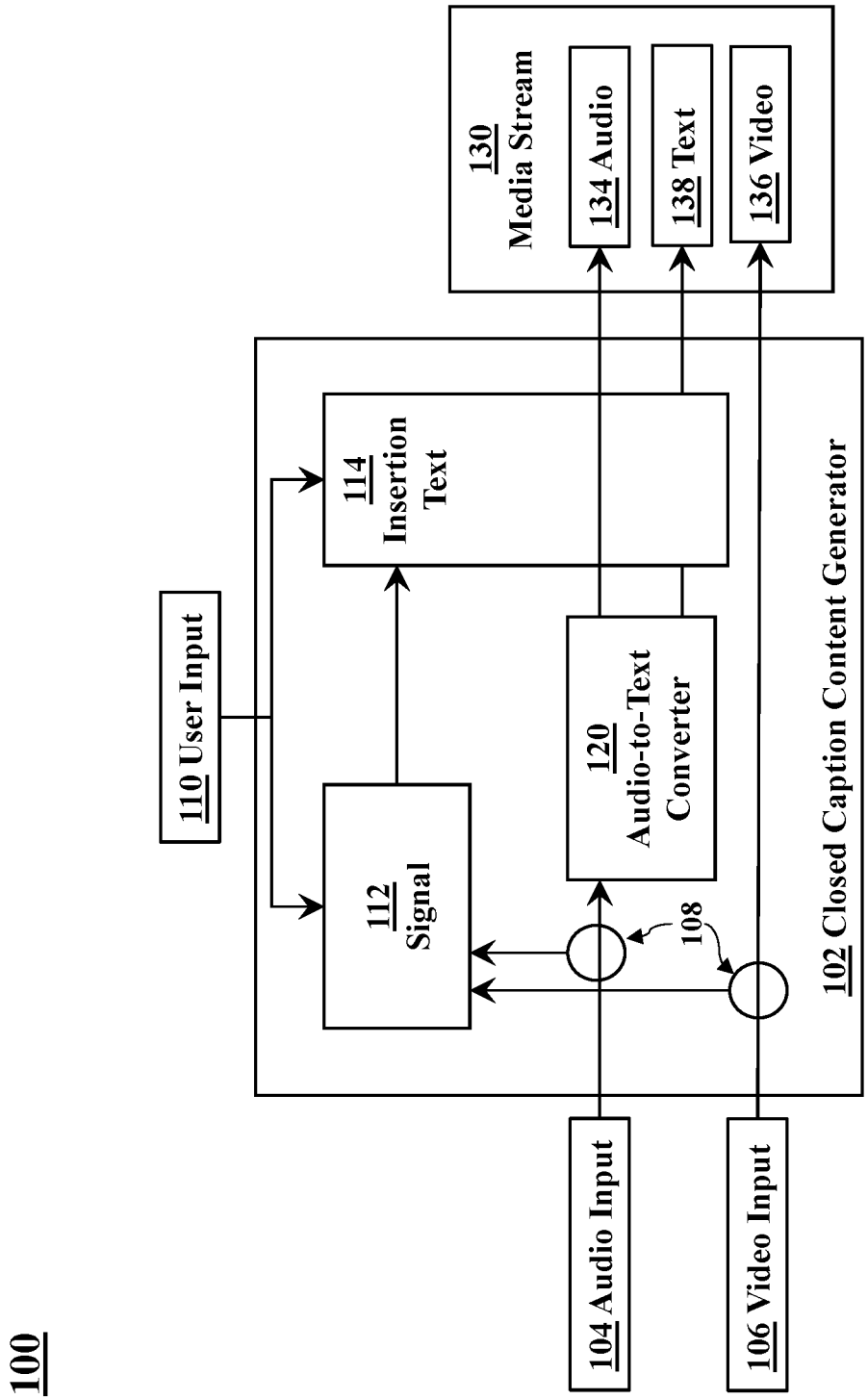
FIG. 1 illustrates a system in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to text generation and more specifically to closed caption content generation.

Closed captioning may aid deaf or hard of hearing individuals to access audiovisual programming. Text content for the closed captioning may be generated using speech-to-text technology, and the generated text may be embedded into the television and/or broadcast content for transmission. In some embodiments, an individual recorded in a video will be reading from known text; thus, the written text is converted into sound by the individual, then from sound back into text by the speech-to-text technology, and the converted text is embedded into the television and/or broadcast content. The accuracy of the captioned text may depend on the signal-to-noise ratio of the produced audio, the clarity (e.g., enunciation) of the speech, the quality of the speech-to-text application, and/or the pronunciation skill of the individual in the language used.

In accordance with some embodiments, these negative impacts on closed captioning accuracy may be circumvented by removing unnecessary text-to-speech-to-text translation. The present disclosure may replace indirect text generation with a direct input of known text into the caption content. Direct input of known text may improve the accuracy of the caption text.

In some embodiments, a user may signal a content generation system to insert a selection of known text. The signal may indicate speech-to-text analysis may be circumvented, in whole or in part, and the signal may or may not indicate precisely where the text is to be inserted. In an example of the signal indicating expressly where to insert text as well as both where the inserted text begins and where it ends in a video, a user may signal a closed-captioned text generator to insert a text script into a 120 second video starting at a timestamp of 23 seconds and ending at 98 seconds.

In some embodiments, such a signal may be embedded in a control code or an escape code for insertion of text. The control code or escape code may be implemented via any mechanism known in the art or hereinafter developed. In some embodiments, the control or escape code could be embedded as an in-band signal (e.g., a sound or noise trigger contained in the audio stream). In some embodiments, the control code or escape code could be transmitted via an out-of-band signal (e.g., a set of keystrokes on a keyboard, specific mouse movement, or hand gesture). A control code or escape code may indicate the start and/or a stop of a command to insert text. In some embodiments, the signal may be explicit (e.g., a direct command to insert a provided text); in some embodiments, the signal may be implicit (e.g., lacking similarity between a script and a recording). In some embodiments, both explicit and implicit signals may be used.

A system in accordance with the present disclosure may include a memory and a processor in communication with the memory. The processor may be configured to perform operations. The operations may include receiving an audio file and a text file related to the audio file, analyzing the audio file to produce an analysis, and determining a portion of the audio file is similar to a segment of the text file. The operations may include identifying a first terminal signal and corresponding the first terminal signal to a first terminal tag in the text file; the first terminal signal may identify a first portion terminal end of the portion and the first terminal tag may identify a first segment terminal end of the segment. The operations may include generating a converted text from the analysis and inserting the segment into the converted text; the first terminal tag may be aligned with the first terminal signal.

In some embodiments of the present disclosure, a natural language processor (NLP) may analyze the audio file to produce the analysis.

In some embodiments of the present disclosure, the operations may include correlating the portion to the segment to deduce the first terminal signal.

In some embodiments of the present disclosure, the operations may include deducing a second terminal signal, wherein the second terminal signal identifies a second terminal end of the audio file and matching the second terminal signal to a second terminal tag in the text file.

In some embodiments of the present disclosure, the operations may include receiving the first terminal signal from a user.

In some embodiments of the present disclosure, the operations may include compiling the text file and the audio file into a media file. In some embodiments, the operations may further include streaming the media file to a user.

In some embodiments of the present disclosure, the operations may include inserting the segment into the converted text includes replacing a section of the converted text corresponding with the portion.

In some embodiments of the present disclosure, the operations may include pausing the generating after the inserting and continuing the generating the converted text after the segment.

Some embodiments may use explicit start and end signals for switching between using the audio-to-text converter and inserting a known text. A content generator may submit start and end signals to the system (e.g., a start trigger and an end trigger). Start and end signals may be in the audio band, such as a verbal command or a tonal cue to start and end the insertion of the known text. Start and end triggers may be configured by or for an individual system. For example, one system may use the command, "Script start," to change from converting text using an NLP to inserting the known text and, "Script end," to revert to using the NLP; in another system, an express start command may be an ascending G major arpeggio at 142 bpm, and an express end command may be a descending G major arpeggio at 130 bpm. The end signal may result in reverting to using the audio-to-text converter, switching tasks, ending the stream, or the like.

Some embodiments may use an explicit start signal and deduce the end signal; similarly, some embodiments may use a deduced start signal and an explicit end signal. A deduced start signal may be, for example, that the system identifies a converted text matches or nearly matches a submitted text or portion thereof; a deduced end signal may be, for example, that the system identifies that there is no more known text (thus the known text is no longer available) or that the audio no longer matches the known text.

In an embodiment with an explicit start signal and a deduced end signal, a system may receive an audio stream and a known text. The audio stream may be converted into a generated text via a speech-to-text converter (e.g., an NLP engine). The system may receive a start signal (e.g., a trigger body posture identifiable via a specific pose in a camera frame) from the content generator, stop generating the text with the speech-to-text converter, and insert the known text into the text stream. The speech-to-text converter may continue to convert the audio to text and not enter the converted text into the text stream. The system may identify that the speech-to-text converted text matches the ending of the submitted known text and resume entering the converted text into the text stream after the end of the matching text.

In an embodiment with a deduced start signal and an explicit end signal, a system may receive an audio stream and a known text. The audio stream may be converted into a generated text via a speech-to-text converter. The system may identify that the speech-to-text converted text matches a segment of the submitted known text, stop generating the text with the speech-to-text converter, and insert the known text into the text stream. The speech-to-text converter may continue to convert the audio to text and not enter the converted text into the text stream. The system may receive an end signal from the content generator (e.g., a keystroke pattern) to direct the system to resume entering the converted text into the text stream.

FIG. 1 illustrates a system 100 in accordance with some embodiments of the present disclosure. The system 100 includes a closed caption content generator 102, an audio input 104, a video input 106, a user input 110, and a media stream 130 output.

The audio input 104 and the video input 106 enter into the closed caption content generator 102. The closed caption content generator 102 intercepts 108 the audio input 104 and the video input 106 to identify and/or match for a signal 112 received via user input 110. The signal 112 may correspond with insertion text 114 entered via user input 110 such that the signal 112 indicates to the closed caption content generator 102 when to pause and/or start the audio-to-text converter 120. Pausing the audio-to-text converter 120 may result in the closed caption content generator 102 adding the insertion text 114 into the output text 138 for inclusion in the media stream 130.

The signal 112 may, for example, be an express indication of where to stop converting audio to text using the audio-to-text converter 120; in some embodiments, the signal 112 may be an explicit command to insert a text in a prescribed context (e.g., at a certain timestamp in the audio and/or at an identified word in the known text). The signal 112 may include an express start indicator, an express end indicator, or a combination thereof. For example, the signal 112 may include both a start and stop indicator for a single insertion of known text (e.g., a chapter from a book), multiple timestamps for multiple starts and corresponding stops of segments of known text (e.g., a written speech with improvisation segments indicated to the system 100 via signal 112), one or more identified starts (e.g., identifying the start of paragraphs within a prepared oration), one or more identified stops (e.g., identifying a speaker has veered from a prepared script, triggering the audio-to-text converter 120 to convert the audio into text), and the like.

The signal 112 may indicate where an insertion text 114 is to be inserted into a text 138 submitted as part of a media stream 130. The audio-to-text converter 120 may generate computer-generated text from the audio input 104, and the insertion text 114 may replace some or all of the computer-generated text generated by the audio-to-text converter 120 for output as text 138 in the media stream 130. The text 138 may contain converted text (as in, text generated using the audio-to-text converter 120) as well as insertion text 114 (which may also be referred to as known text).

The closed caption content generator 102 may compile the audio input 104, the video input 106, and user input 110 into a media stream 130. In some embodiments, one or more inputs may be combined (e.g., the audio input 104 and/or the video input 106 may be submitted as part of the user input 110). Some embodiments may exclude certain inputs (e.g., a video input 106 or user input 110 may not be included). In some embodiments, an audio input 104 may not be submitted to an audio-to-text converter 120 in a closed caption content generator 102; for example, an audio input 104 may be in a first language and the user input 110 may include a script for the text 138 in a second language. In some embodiments, the user input 110 may include script for the text 138 and a signal 112 embedded in the script to match the script to certain sections of the audio (e.g., to ensure the translation matches the tempo of the audio input 104).

The closed caption content generator 102 may compile the inputs into an output such as a media stream 130. The media stream 130 may include audio 134, text 138 and/or video 136. In some embodiments, the media stream 130 may include fewer components; for example, the media stream 130 may only include a text 138 component such that an audio input 104 and/or a video input 106 are compiled with a user input 110 to generate a text 138 (e.g., a more complete and/or more accurately transcribed transcript of an event) which may be posted independently and/or adjacent to a separate component (e.g., a recording of the event).

The user input 110 may include one signal 112 or more than one signal 112. In some embodiments, the signal 112 may be embedded in the audio input 104 or in the video input 106, or the signal 112 may include a reference to the audio input 104, a reference to the video input 106, a timestamp of the audio input 104, a timestamp of the video input 106, or a combination thereof. In some embodiments, multiple copies of the same signal 112 may be embedded throughout the inputs; for example, a signal 112 may indicate particular points (e.g., multiple start points matching identified portions in an insertion text 114) in the audio input 104 and/or the video input 106 as well as the matching points in the insertion text 114. In embodiments using more than one signal 112, each signal 112 may be input by a user (e.g., via user input 110), deduced by the system 100 (e.g., identified by similarity between the insertion text 114 and the audio input 104 and/or the video input 106), or some combination thereof.

Deduction of similarity between points in the audio input 104 and/or the video input 106 and the insertion text 114 may be done according to any means known in the art or hereinafter developed. For example, the audio-to-text converter 120 may convert an input (e.g., an audio input 104 and/or a video input 106) into a converted text, identify a string of words in the converted text that match a string of words in the insertion text 114, identify a start to the matching between the string of words in the converted text and the string of words in the insertion text 114, identify an end to the matching between the string of words in the converted text and the string of words in the insertion text 114, and exchange the generated text for the insertion text 114 between the identified start and end of the string of similar words.

The threshold of similarity of words (e.g., the percentage of the words that are the same) may vary. For example, a similarity threshold may vary based on audio input 104 quality, video input 106 quality, mechanics of the audio-to-text converter 120, user preference, and the like. The mechanism for determining similarity may vary. For example, similarity may be identified by comparing the number of words that are the same, include or exclude counting homophones and/or homographs, identifying specific sounds, or other comparative identifier.

In some embodiments, both start and end signals may be deduced. For example, a content generator (e.g., a person making a video) may submit known text (e.g., a prepared speech) as well as a recording of the text (e.g., an audio or video performance of the speech) to a system to produce a stream with both audio and a closed caption thereof. The system may process the recording (e.g., the audio stream, or the audio portion of a video file) with a text converter. The text converter may be, for example, a natural language processor or similar speech processing engine. The system may match the text converter output text (in whole or in part) to the known text. In some embodiments, the system may swap the matched generated text for the known text. In some embodiments, the system may match the text, pause the insertion of text from the text converter, insert the known text, and re-commence the text converter (e.g., when the text no longer matches). In some embodiments, the system may match the text converter output text to the known text while the text converter is converting the text; in some such embodiments, the system may stop the text converter and input the known text into the closed caption text stream.

Figure 2:
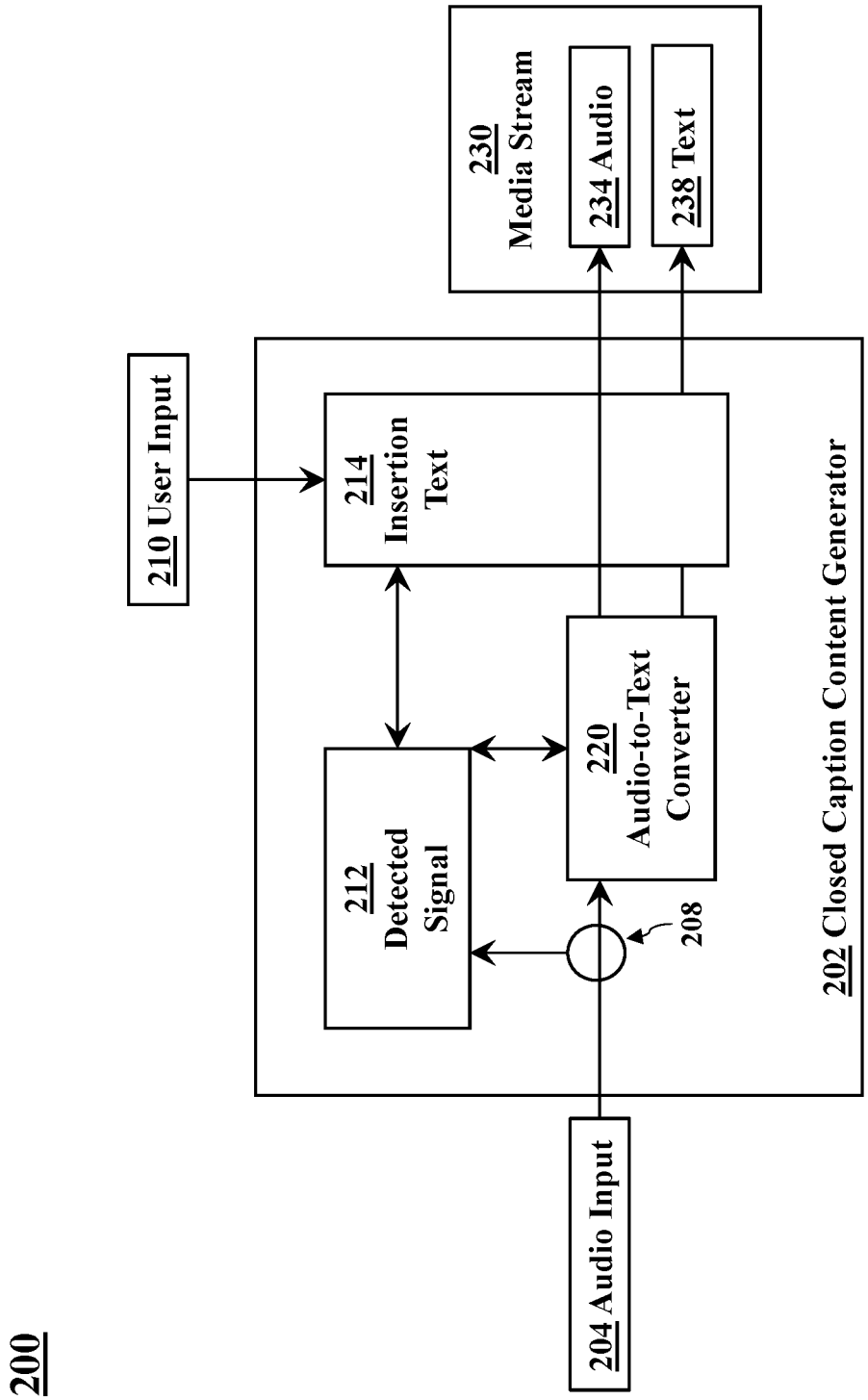
FIG. 2 depicts a system in accordance with some embodiments of the present disclosure.

FIG. 2 depicts a system 200 in accordance with some embodiments of the present disclosure. The system 200 includes a closed caption content generator 202, an audio input 204, a user input 210, and a media stream 230 output.

The audio input 204 may be submitted to the closed caption content generator 202. The closed caption content generator 202 intercepts 208 the audio input 204 to identify and/or match for a detected signal 212 deduced from the audio input 204 and the user input 210. The detected signal 212 may correspond with insertion text 214 entered via user input 210. The detected signal 212 may indicate to the closed caption content generator 202 when to pause and/or start the audio-to-text converter 220. Pausing the audio-to-text converter 220 may result in the closed caption content generator 202 adding the insertion text 214 into the output text 238 for inclusion in the media stream 230.

The detected signal 212 may be deduced from the audio input 204, the audio-to-text converter 220 (e.g., via the converted text or other identifier the audio-to-text converter 220 produces), the insertion text 214, or some combination thereof. The detected signal 212 may be deduced from similarities, for example, between the audio input 204 and the insertion text 214, the converted text generated by the audio-to-text generator 220 and the insertion text 220, or some combination thereof.

The closed caption content generator 202 may output a media stream 230. The media stream 230 may include audio 234, text 238, and/or visual components. In some embodiments, the media stream 230 may be separated into an audio 234 component (e.g., a podcast recording) and a text 238 component (e.g., a transcript of the podcast recording), and the separate components may be streamed together or separately to a user (e.g., the user who provided the user input 210) or an audience (e.g., a podcast subscriber).

A method in accordance with the present disclosure may be implemented by a computer. The method may include receiving an audio file and a text file related to the audio file, analyzing the audio file to produce an analysis, and determining a portion of the audio file is similar to a segment of the text file. The method may include identifying a first terminal signal; the first terminal signal may identify a first portion terminal end of the portion. The method may include corresponding the first terminal signal to a first terminal tag in the text file; the first terminal tag may identify a first segment terminal end of the segment, and it may be aligned with the first terminal signal. The method may also include generating a converted text from the analysis and inserting the segment into the converted text.

In some embodiments of the present disclosure, a natural language processor (NLP) may analyze the audio file to produce the analysis.

In some embodiments of the present disclosure, the method may include correlating the portion to the segment to deduce the first terminal signal.

In some embodiments of the present disclosure, the method may include deducing a second terminal signal, wherein the second terminal signal identifies a second terminal end of the audio file and matching the second terminal signal to a second terminal tag in the text file.

In some embodiments of the present disclosure, the method may include receiving the first terminal signal from a user.

In some embodiments of the present disclosure, the method may include compiling the text file and the audio file into a media file. In some embodiments, the method may further include streaming the media file to a user.

In some embodiments of the present disclosure, the method may include inserting the segment into the converted text includes replacing a section of the converted text corresponding with the portion.

In some embodiments of the present disclosure, the method may include pausing the generating after the inserting and continuing the generating the converted text after the segment.

Figure 3:
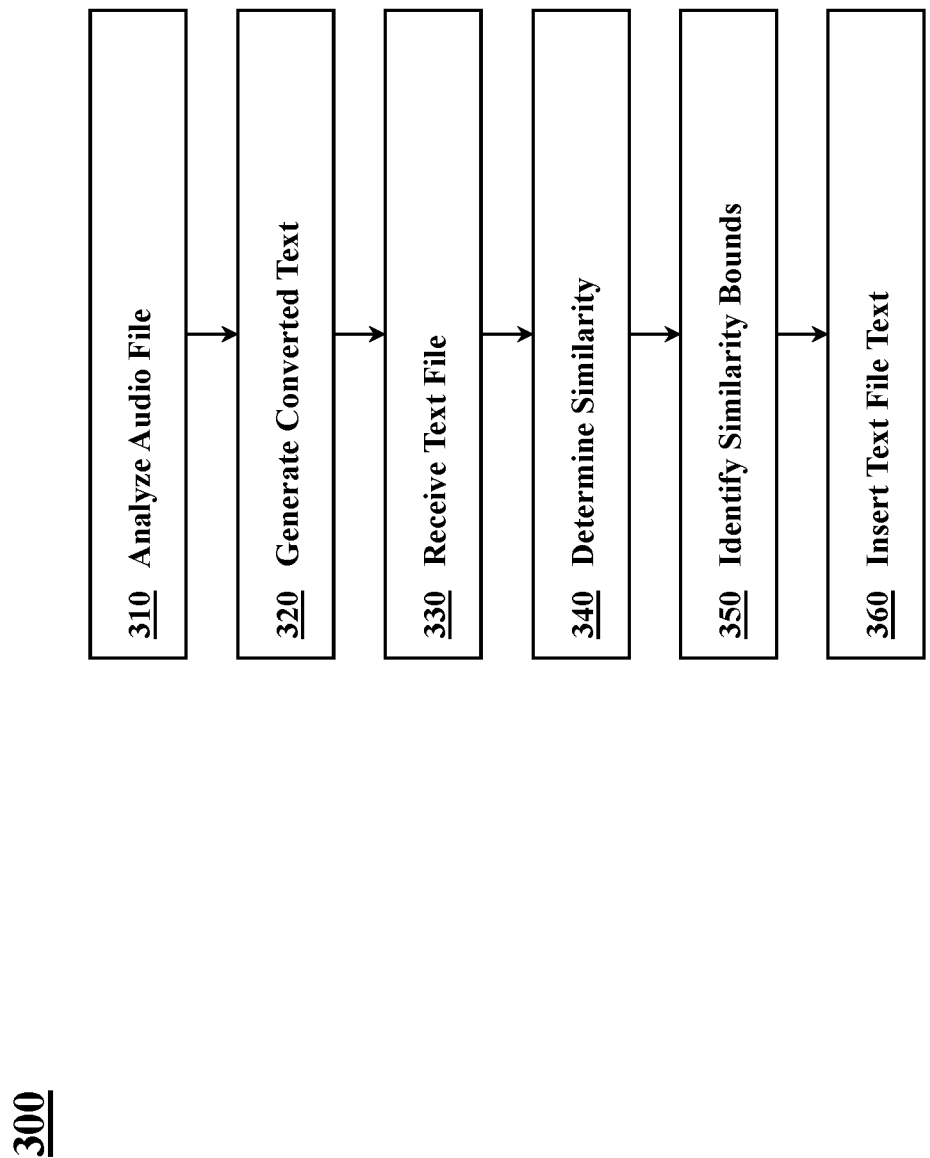
FIG. 3 illustrates a method in accordance with some embodiments of the present disclosure.

FIG. 3 illustrates a method 300 in accordance with some embodiments of the present disclosure. The method 300 includes analyzing 310 an audio file to produce an analysis and generating 320 a converted text from the analysis. The method 300 includes receiving 330 a text file and determining 340 a similarity between the text file and the converted text or the analysis of the original audio file. The method 300 includes identifying 350 the bounds of the similarity and inserting 360 the text file text within the bounds.

The method 300 may be implemented by a system (e.g., a computer). The audio file may be submitted to the system or a subcomponent thereof (e.g., a closed caption content generator 202 as shown in FIG. 2). The system may have an audio-to-text conversion component such as, for example, an NLP engine. The audio-to-text conversion component may produce an analysis by analyzing 310 the audio file and use the analysis for generating 320 a converted text.

The computer may continue the method 300 by receiving 330 a file of known text regarding the audio file. For example, the known text may be a book and the audio file may be a recording of an individual reading the book. The computer may receive the text file via any mechanism known in the art or hereinafter discovered such as, for example, via email, direct download, upload, cable transfer, wireless transfer, or some combination thereof.

The computer may continue the method 300 by determining 340 a similarity between the audio file and the text file. In some embodiments, an explicit signal may be used to identify to the computer that the text file is a transcription of the audio file. In some embodiments, the computer may deduce the similarity between the files based on, for example, a comparison of words, word strings, phrases, other patterns, or a combination thereof. Similarity may be determined according to any mechanism known in the art or hereinafter developed. The threshold for similarity between the files may be adjusted based on the embodiment, equipment and programs used, user preference, clarity of the audio recording, enunciation of the speaker, experience of the speaker in the relevant language, and the like.

The computer may continue the method 300 by identifying 350 similarity bounds. The similarity bounds may be an entire file, one or more segments of a file, or a combination thereof. An example of multiple sets of similarity bounds in one file pairing with an entire file might be, for example, an audio file that is a presentation of a written speech, and the written speech is submitted to the system as a text file; the audio file may have multiple sections that correlate with the written speech and other sections that are not found in the text file (e.g., improvisation). The audio file may thus have a variety of sections that are similar to the text file, and the text file as a whole may be considered the similarity bounds; the text file may include signals or tags to match the bounds of the audio file (e.g., to mark the start or end of text segments that match signals indicating similar portions of audio). The computer may identify the various sections of the audio file, match where the text file aligns, and use converted text for the components of the audio file that do not have a matching text file component.

In some embodiments, the bounds of similarity may be referred to as terminal ends such that each pair of terminal ends indicates the start of a similarity portion and the end of the similarity portion; a terminal end may refer to the start or stop of similarity. For example, a first terminal end may indicate the first location in an audio file that matches the text in the text file, and a second terminal end may indicate the bound where the similarity ends. Each file may have any number of terminal ends, and terminal ends may be explicit (e.g., directly indicated by a user) or implicit (e.g., deduced by the system based on the similarity between a text file and an audio file or a converted text). Similarity bounds (also referred to as terminal ends) may be associated with signals indicating the similarity bounds; in some embodiments, the signals may be referred to as terminal signals. Terminal signals may indicate the termination of similarity between files.

Similarity may be a measurement of likeness between the audio file and the text file. A threshold of similarity may be, for example, set by a user, set by a third party (e.g., a product provider), or set by a third party as configurable by the user (e.g., default settings that may be changed per user preference). Similarity may include a lower threshold up to and including exact matching of an audio file and a text file.

The computer may continue the method 300 by inserting 360 text from the text file into the bounds of similarity. In some embodiments, the audio file may directly reflect the text in the text file (e.g., the only bounds of similarity in each file are the beginning and the end). In some embodiments, the audio file may have portions similar to the text in the text file, resulting in multiple sets of terminal ends; the text file may be imported into the converted text in similarity segments. Inserting 360 the text file text may include matching one or more terminal signals between the files (e.g., aligning a start tag in the text file with a start tag in the audio file).

In some embodiments, the computer may determine when to identify text generated as an output of automatic speech recognition (ASR) with known data (e.g., the text of a file signaled to the computer as a partial or full transcript of the related audio file). For example, a computer may identify that an oration recording largely reflects a submitted text, and that the submitted text and the recording differ in one or more places; a similarity threshold may determine that certain paragraphs from the submitted text accurately reflect what was stated, that other paragraphs were omitted from the oration, and that other paragraphs were paraphrased in the oration. Based on the similarity thresholds and provided signals, the computer may identify which segments to copy from the known data text into the ASR-converted text and which segments for which to use the ASR-converted text to best achieve any defined objectives.

A method 300 in accordance with the present disclosure may be implemented by a computer. The method 300 may include receiving 330 an audio file and a text file related to the audio file, analyzing 310 the audio file with a natural language processor to produce an analysis, and determining 340 a portion of the audio file is similar to a segment of the text file. The method 300 may include identifying 350 a first terminal signal; the first terminal signal may identify a first portion terminal end of the portion. The method 300 may include corresponding the first terminal signal to a first terminal tag in the text file; the first terminal tag may identify a first segment terminal end of the segment. The method 300 may also include generating 320 a converted text from the analysis and inserting 360 the segment into the converted text; the first terminal tag may be aligned with the first terminal signal.

Figure 4:
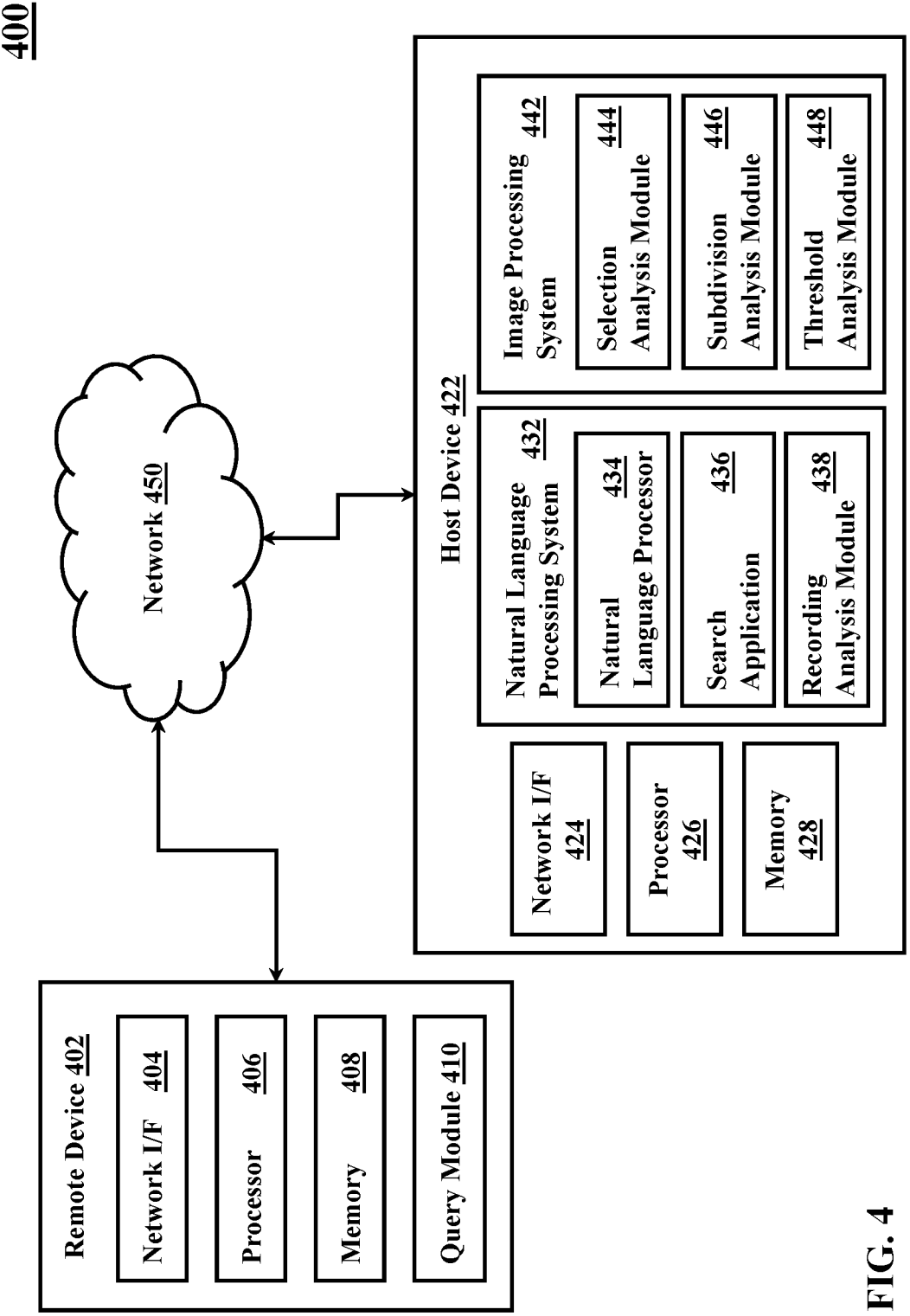
FIG. 4 illustrates a block diagram of an example computing environment in which illustrative embodiments of the present disclosure may be implemented.

Some embodiments of the present disclosure may utilize a natural language parsing and/or subparsing component. Thus, aspects of the disclosure may relate to natural language processing. Accordingly, an understanding of the embodiments of the present invention may be aided by describing embodiments of natural language processing systems and the environments in which these systems may operate. Turning now to FIG. 4, illustrated is a block diagram of an example computing environment 400 in which illustrative embodiments of the present disclosure may be implemented. In some embodiments, the computing environment 400 may include a remote device 402 and a host device 422.

Consistent with various embodiments of the present disclosure, the host device 422 and the remote device 402 may be computer systems. The remote device 402 and the host device 422 may include one or more processors 406 and 426 and one or more memories 408 and 428, respectively. The remote device 402 and the host device 422 may be configured to communicate with each other through an internal or external network interface 404 and 424. The network interfaces 404 and 424 may be modems or network interface cards. The remote device 402 and/or the host device 422 may be equipped with a display such as a monitor. Additionally, the remote device 402 and/or the host device 422 may include optional input devices (e.g., a keyboard, mouse, scanner, or other input device) and/or any commercially available or custom software (e.g., browser software, communications software, server software, natural language processing software, search engine and/or web crawling software, filter modules for filtering content based upon predefined parameters, etc.). In some embodiments, the remote device 402 and/or the host device 422 may be servers, desktops, laptops, or hand-held devices.

The remote device 402 and the host device 422 may be distant from each other and communicate over a network 450. In some embodiments, the host device 422 may be a central hub from which remote device 402 can establish a communication connection, such as in a client-server networking model. Alternatively, the host device 422 and remote device 402 may be configured in any other suitable networking relationship (e.g., in a peer-to-peer configuration or using any other network topology).

In some embodiments, the network 450 can be implemented using any number of any suitable communications media. For example, the network 450 may be a wide area network (WAN), a local area network (LAN), an internet, or an intranet. In certain embodiments, the remote device 402 and the host device 422 may be local to each other and communicate via any appropriate local communication medium. For example, the remote device 402 and the host device 422 may communicate using a local area network (LAN), one or more hardwire connections, a wireless link or router, or an intranet. In some embodiments, the remote device 402 and the host device 422 may be communicatively coupled using a combination of one or more networks and/or one or more local connections. For example, the remote device 402 may be hardwired to the host device 422 (e.g., connected with an Ethernet cable) or the remote device 402 may communicate with the host device using the network 450 (e.g., over the Internet).

In some embodiments, the network 450 can be implemented within a cloud computing environment or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 450.

In some embodiments, the remote device 402 may enable a user to input (or may input automatically with or without a user) a query (e.g., is any part of a recording artificial, etc.) to the host device 422 in order to identify subdivisions of a recording that include a particular subject. For example, the remote device 402 may include a query module 410 and a user interface (UI). The query module 410 may be in the form of a web browser or any other suitable software module, and the UI may be any type of interface (e.g., command line prompts, menu screens, graphical user interfaces). The UI may allow a user to interact with the remote device 402 to input, using the query module 410, a query to the host device 422, which may receive the query.

In some embodiments, the host device 422 may include a natural language processing system 432. The natural language processing system 432 may include a natural language processor 434, a search application 436, and a recording module 438. The natural language processor 434 may include numerous subcomponents, such as a tokenizer, a part-of-speech (POS) tagger, a semantic relationship identifier, and a syntactic relationship identifier. An example natural language processor is discussed in more detail in reference to FIG. 5.

The search application 436 may be implemented using a conventional or other search engine and may be distributed across multiple computer systems. The search application 436 may be configured to search one or more databases (e.g., repositories) or other computer systems for content that is related to a query submitted by the remote device 402. For example, the search application 436 may be configured to search dictionaries, papers, and/or archived reports to help identify a particular subject related to a query provided for a class. The recording analysis module 438 may be configured to analyze a recording to identify a particular subject (e.g., of the query). The recording analysis module 438 may include one or more modules or units, and may utilize the search application 436, to perform its functions (e.g., to identify a particular subject in a recording), as discussed in more detail in reference to FIG. 5.

In some embodiments, the host device 422 may include an image processing system 442. The image processing system 442 may be configured to analyze images associated with a recording to create an image analysis. The image processing system 442 may utilize one or more models, modules, or units to perform its functions (e.g., to analyze the images associated with the recording and generate an image analysis). For example, the image processing system 442 may include one or more image processing models that are configured to identify specific images related to a recording. The image processing models may include a section analysis module 444 to analyze single images associated with the recording and to identify the location of one or more features of the single images. As another example, the image processing system 442 may include a subdivision module 446 to group multiple images together identified to have a common feature of the one or more features. In some embodiments, image processing modules may be implemented as software modules. For example, the image processing system 442 may include a section analysis module and a subdivision analysis module. In some embodiments, a single software module may be configured to analyze the image(s) using image processing models.

In some embodiments, the image processing system 442 may include a threshold analysis module 448. The threshold analysis module 448 may be configured to compare the instances of a particular subject identified in a subdivision of sections of the recording against a threshold number of instances. The threshold analysis module 448 may then determine if the subdivision should be displayed to a user.

In some embodiments, the host device may have an optical character recognition (OCR) module. The OCR module may be configured to receive a recording sent from the remote device 402 and perform optical character recognition (or a related process) on the recording to convert it into machine-encoded text so that the natural language processing system 432 may perform NLP on the report. For example, a remote device 402 may transmit a video of a speech presentation to the host device 422. The OCR module may convert the video into machine-encoded text and then the converted video may be sent to the natural language processing system 432 for analysis. In some embodiments, the OCR module may be a subcomponent of the natural language processing system 432. In other embodiments, the OCR module may be a standalone module within the host device 422. In still other embodiments, the OCR module may be located on the remote device 402 and may perform OCR on the recording before the recording is sent to the host device 422.

While FIG. 4 illustrates a computing environment 400 with a single host device 422 and a remote device 402, suitable computing environments for implementing embodiments of this disclosure may include any number of remote devices and host devices. The various models, modules, systems, and components illustrated in FIG. 4 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze a video, and the second host device may include an image processing system configured to receive and analyze .GIFS to generate an image analysis.

It is noted that FIG. 4 is intended to depict the representative major components of an exemplary computing environment 400. In some embodiments, however, individual components may have greater or lesser complexity than as represented in FIG. 4, components other than or in addition to those shown in FIG. 4 may be present, and the number, type, and configuration of such components may vary.

Figure 5:
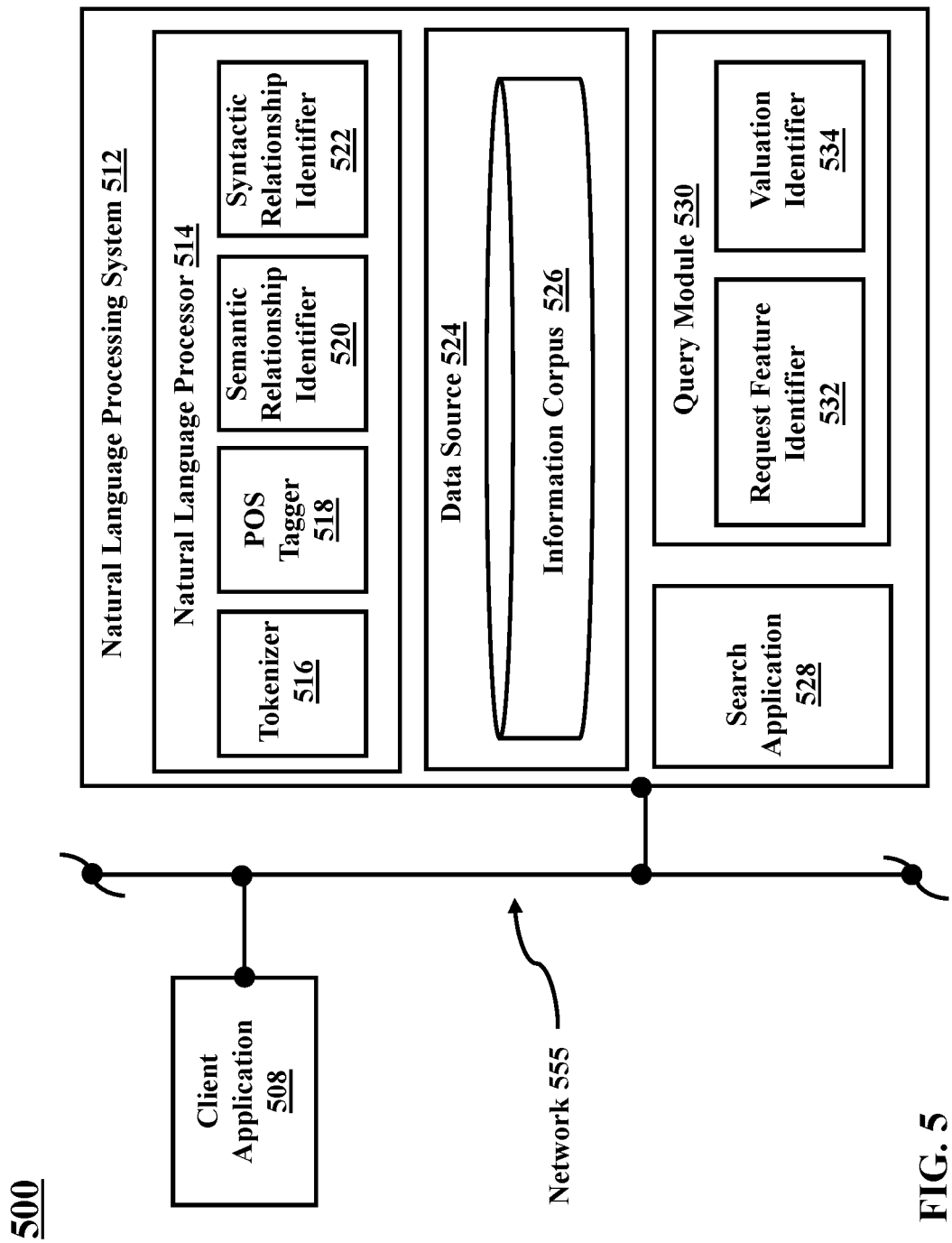
FIG. 5 depicts a block diagram of an example natural language processing system configured to analyze a recording to identify a particular subject of a query, in accordance with embodiments of the present disclosure.

Referring now to FIG. 5, shown is a block diagram of an exemplary system architecture 500 including a natural language processing system 512 configured to analyze data to identify objects of interest (e.g., possible anomalies, natural data, etc.), in accordance with embodiments of the present disclosure. In some embodiments, a remote device (such as remote device 402 of FIG. 4) may submit a text segment and/or a corpus to be analyzed to the natural language processing system 42912 which may be housed on a host device (such as host device 422 of FIG. 4). Such a remote device may include a client application 508, which may itself involve one or more entities operable to generate or modify information associated with the recording and/or query that is then dispatched to a natural language processing system 512 via a network 555.

Consistent with various embodiments of the present disclosure, the natural language processing system 512 may respond to text segment and corpus submissions sent by a client application 508. Specifically, the natural language processing system 512 may analyze a received text segment and/or corpus (e.g., video, news article, etc.) to identify an object of interest. In some embodiments, the natural language processing system 512 may include a natural language processor 514, data sources 524, a search application 528, and a query module 530. The natural language processor 514 may be a computer module that analyzes the recording and the query. The natural language processor 514 may perform various methods and techniques for analyzing recordings and/or queries (e.g., syntactic analysis, semantic analysis, etc.). The natural language processor 514 may be configured to recognize and analyze any number of natural languages. In some embodiments, the natural language processor 514 may group one or more sections of a text into one or more subdivisions. Further, the natural language processor 514 may include various modules to perform analyses of text or other forms of data (e.g., recordings, etc.). These modules may include, but are not limited to, a tokenizer 516, a part-of-speech (POS) tagger 518 (e.g., which may tag each of the one or more sections of text in which the particular object of interest is identified), a semantic relationship identifier 520, and a syntactic relationship identifier 522.

In some embodiments, the tokenizer 516 may be a computer module that performs lexical analysis. The tokenizer 516 may convert a sequence of characters (e.g., images, sounds, etc.) into a sequence of tokens. A token may be a string of characters included in a recording and categorized as a meaningful symbol. Further, in some embodiments, the tokenizer 516 may identify word boundaries in a body of text and break any text within the body of text into their component text elements, such as words, multiword tokens, numbers, and punctuation marks. In some embodiments, the tokenizer 516 may receive a string of characters, identify the lexemes in the string, and categorize them into tokens.

Consistent with various embodiments, the POS tagger 518 may be a computer module that marks up a word in a recording to correspond to a particular part of speech. The POS tagger 518 may read a passage or other text in natural language and assign a part of speech to each word or other token. The POS tagger 518 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed body of texts and/or corpora (e.g., the content of one text segment may shed light on the meaning of one or more objects of interest in another text segment). Examples of parts of speech that may be assigned to words include, but are not limited to, nouns, verbs, adjectives, adverbs, and the like. Examples of other part of speech categories that POS tagger 518 may assign include, but are not limited to, comparative or superlative adverbs, wh-adverbs, conjunctions, determiners, negative particles, possessive markers, prepositions, wh-pronouns, and the like. In some embodiments, the POS tagger 518 may tag or otherwise annotate tokens of a recording with part of speech categories. In some embodiments, the POS tagger 518 may tag tokens or words of a recording to be parsed by the natural language processing system 512.

In some embodiments, the semantic relationship identifier 520 may be a computer module that may be configured to identify semantic relationships of recognized subjects (e.g., words, phrases, images, etc.) in a body of text/corpus. In some embodiments, the semantic relationship identifier 520 may determine functional dependencies between entities and other semantic relationships.

Consistent with various embodiments, the syntactic relationship identifier 522 may be a computer module that may be configured to identify syntactic relationships in a body of text/corpus composed of tokens. The syntactic relationship identifier 522 may determine the grammatical structure of sentences such as, for example, which groups of words are associated as phrases and which word is the subject or object of a verb. The syntactic relationship identifier 522 may conform to formal grammar.

In some embodiments, the natural language processor 514 may be a computer module that may group sections of a recording into subdivisions and generate corresponding data structures for one or more subdivisions of the recording. For example, in response to receiving a text segment at the natural language processing system 512, the natural language processor 514 may output subdivisions of the text segment as data structures. In some embodiments, a subdivision may be represented in the form of a graph structure. To generate the subdivision, the natural language processor 514 may trigger computer modules 516-522.

In some embodiments, the output of natural language processor 514 may be used by search application 528 to perform a search of a set of (i.e., one or more) corpora to retrieve one or more subdivisions including a particular subject associated with a query (e.g., in regard to an object of interest) and send the output to an image processing system and to a comparator. As used herein, a corpus may refer to one or more data sources, such as a data source 524 of FIG. 5. In some embodiments, data sources 524 may include video libraries, data warehouses, information corpora, data models, and/or document repositories. In some embodiments, the data sources 524 may include an information corpus 526. The information corpus 526 may enable data storage and retrieval. In some embodiments, the information corpus 526 may be a subject repository that houses a standardized, consistent, clean, and integrated list of images and text. For example, an information corpus 526 may include teaching presentations that include step by step images and comments on how to perform a function. Data may be sourced from various operational systems. Data stored in an information corpus 526 may be structured in a way to specifically address reporting and analytic requirements. In some embodiments, an information corpus 526 may be a relational database.

In some embodiments, a query module 530 may be a computer module that identifies objects of interest within sections of a text, or other forms of data. In some embodiments, a query module 530 may include a request feature identifier 532 and a valuation identifier 534. When a query is received by the natural language processing system 512, the query module 530 may be configured to analyze text using natural language processing to identify an object of interest. The query module 530 may first identity one or more objects of interest in the text using the natural language processor 514 and related subcomponents 516-522. After identifying the one or more objects of interest, the request feature identifier 532 may identify one or more common objects of interest (e.g., anomalies, artificial content, natural data, etc.) present in sections of the text (e.g., the one or more text segments of the text). In some embodiments, the common objects of interest in the sections may be the same object of interest that is identified. Once a common object of interest is identified, the request feature identifier 532 may be configured to transmit the text segments that include the common object of interest to an image processing system (shown in FIG. 4) and/or to a comparator.

After identifying common objects of interest using the request feature identifier 532, the query module may group sections of text having common objects of interest. The valuation identifier 534 may then provide a value to each text segment indicating how close the object of interest in each text segment is related to one another (and thus indicates artificial and/or real data). In some embodiments, the particular subject may have one or more of the common objects of interest identified in the one or more sections of text. After identifying a particular object of interest relating to the query (e.g., identifying that one or more of the common objects of interest may be an anomaly), the valuation identifier 534 may be configured to transmit the criterion to an image processing system (shown in FIG. 4) and/or to a comparator (which may then determine the validity of the common and/or particular objects of interest).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
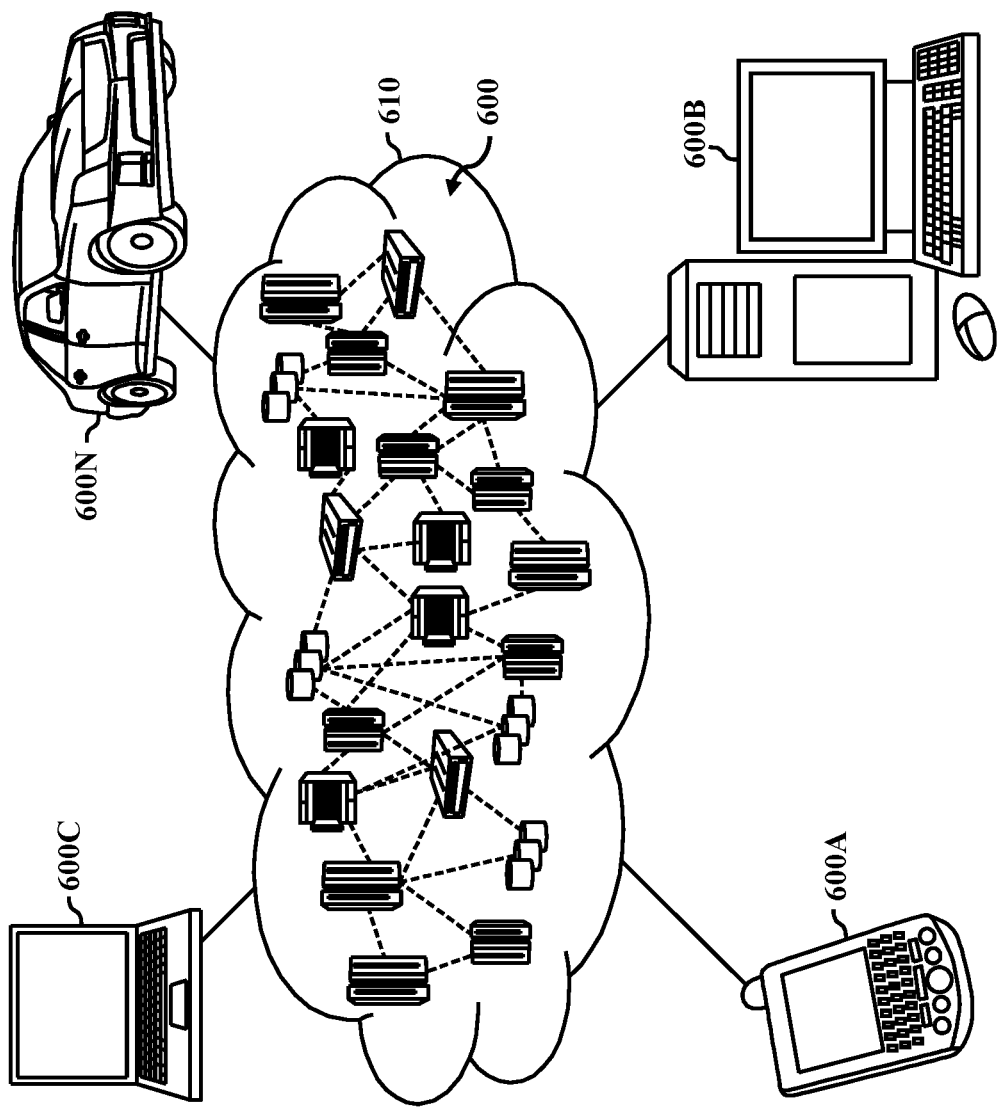
FIG. 6 illustrates a cloud computing environment, in accordance with embodiments of the present disclosure.

FIG. 6 illustrates a cloud computing environment 610 in accordance with embodiments of the present disclosure. As shown, cloud computing environment 610 includes one or more cloud computing nodes 600 with which local computing devices used by cloud consumers such as, for example, personal digital assistant (PDA) or cellular telephone 600A, desktop computer 600B, laptop computer 600C, and/or automobile computer system 600N may communicate. Nodes 600 may communicate with one another. They may be grouped (not shown) physically or virtually, in one or more networks, such as private, community, public, or hybrid clouds as described hereinabove, or a combination thereof.

This allows cloud computing environment 610 to offer infrastructure, platforms, and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
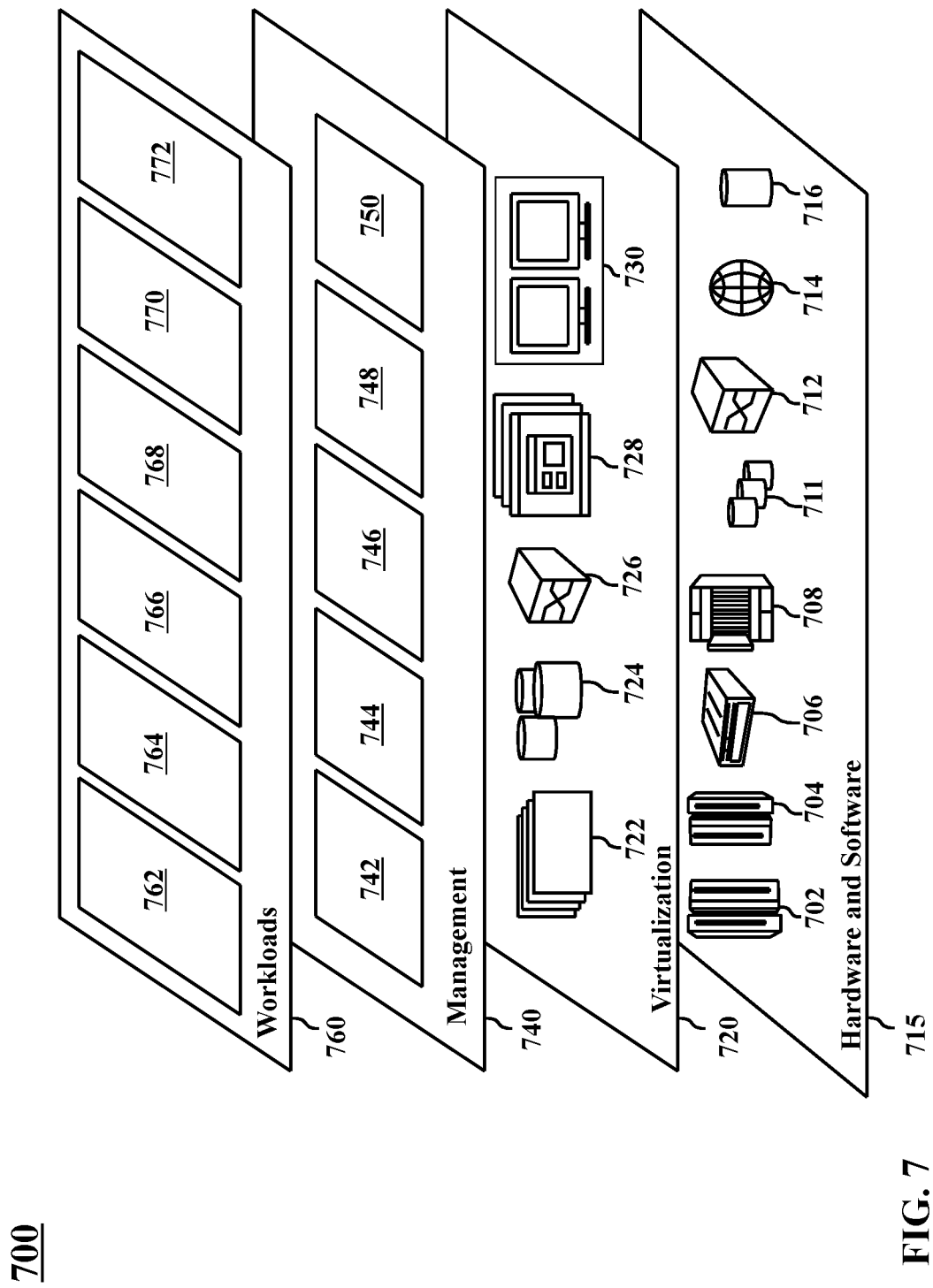
FIG. 7 depicts abstraction model layers, in accordance with embodiments of the present disclosure.

FIG. 7 illustrates abstraction model layers 700 provided by cloud computing environment 610 (FIG. 6) in accordance with embodiments of the present disclosure. It should be understood in advance that the components, layers, and functions shown in FIG. 7 are intended to be illustrative only and embodiments of the disclosure are not limited thereto. As depicted below, the following layers and corresponding functions are provided.

Hardware and software layer 715 includes hardware and software components. Examples of hardware components include: mainframes 702; RISC (Reduced Instruction Set Computer) architecture-based servers 704; servers 706; blade servers 708; storage devices 711; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and pricing 744 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 746 provides access to the cloud computing environment for consumers and system administrators. Service level management 748 provides cloud computing resource allocation and management such that required service levels are met. Service level agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and closed caption content generation 772.

Figure 8:
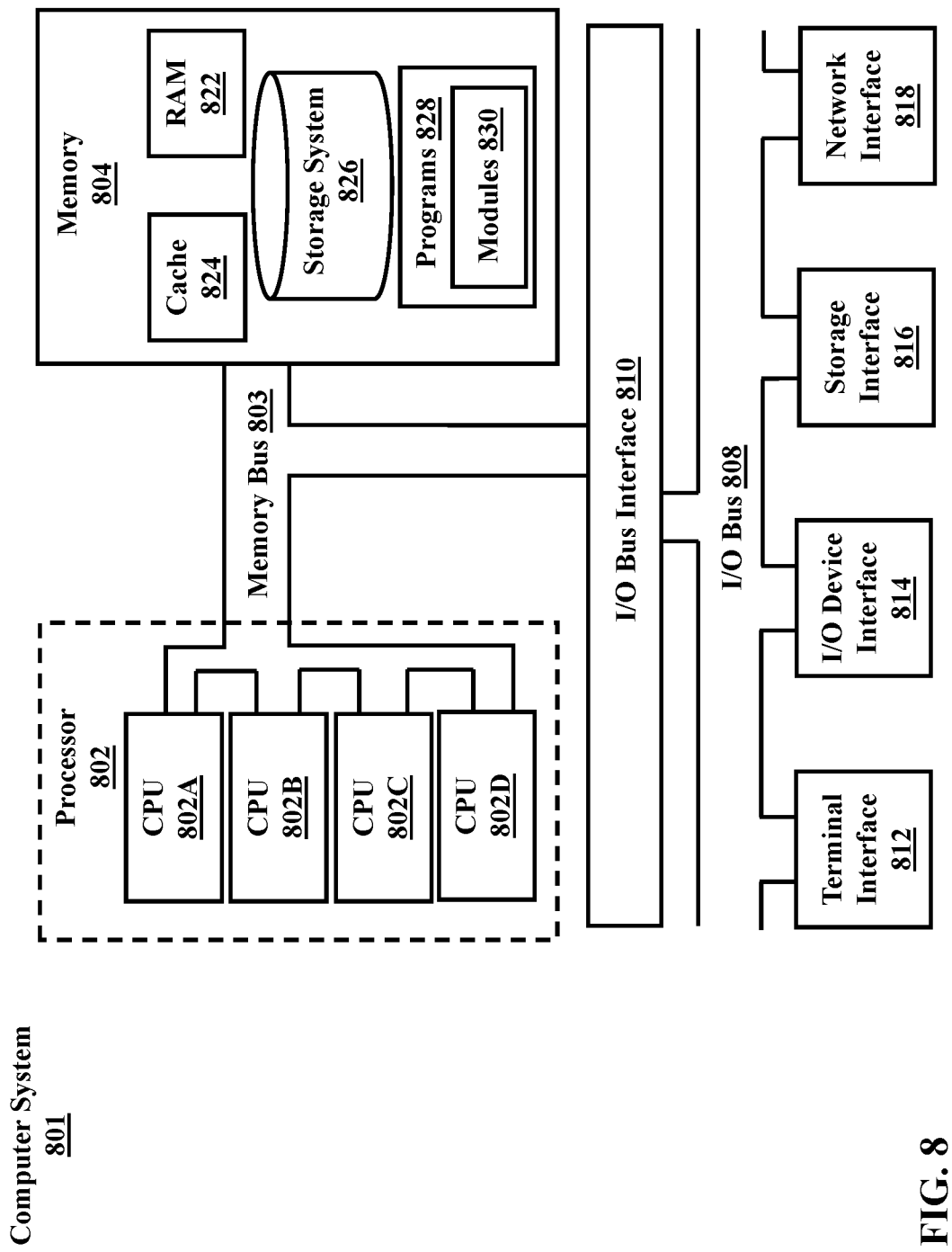
FIG. 8 illustrates a high-level block diagram of an example computer system that may be used in implementing one or more of the methods, tools, and modules, and any related functions, described herein, in accordance with embodiments of the present disclosure.

FIG. 8 illustrates a high-level block diagram of an example computer system 801 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 801 may comprise a processor 802 with one or more central processing units (CPUs) 802A, 802B, 802C, and 802D, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable CPUs 802A, 802B, 802C, and 802D, herein generically referred to as the CPU 802. In some embodiments, the computer system 801 may contain multiple processors typical of a relatively large system; however, in other embodiments, the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830, may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units 810 are shown, which separate the I/O bus 808 from various communications paths running to the various I/O devices, in other embodiments some or all of the I/O devices may be connected directly to one or more system I/O buses 808.

In some embodiments, the computer system 801 may be a multi-user mainframe computer system, a single-user system, a server computer, or similar device that has little or no direct user interface but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
a memory; and
a processor in communication with said memory, said processor being configured to perform operations, said operations comprising:
receiving an audio file;
analyzing said audio file to produce an analysis;
generating a converted text from said analysis;
obtaining a text file, wherein said text file is related to said audio file, and wherein said text file is a known text;
comparing said audio file to a segment of said text file;

determining a portion of said audio file is similar to said segment of said text file by comparing a similarity to a similarity threshold, wherein said similarity is measured based on a percentage of words in said portion of said audio file that match said segment of said text file;

deducing a first terminal signal in said audio file based on said similarity, wherein said first terminal signal identifies a first portion terminal end of said portion of said audio file;

identifying a first terminal tag in said text file, wherein said first terminal tag identifies a first segment terminal end of said segment of said text file;

corresponding said first terminal signal in said audio file to said first terminal tag in said text file; and inserting said segment into said converted text, wherein said first terminal tag is aligned with said first terminal signal.

2. The system product of claim 1, said operations further comprising:
correlating said portion to said segment to deduce said first terminal signal.

3. The system product of claim 1, said operations further comprising:
deducing a second terminal signal, wherein said second terminal signal identifies a second terminal end of said audio file; and
matching said second terminal signal to a second terminal tag in said text file.

4. The system product of claim 1, said operations further comprising:
receiving said first terminal signal from a user.

5. The system product of claim 1, said operations further comprising:
compiling said text file and said audio file into a media file.

6. The system of claim 1, wherein:
inserting said segment into said converted text includes replacing a section of said converted text corresponding with said portion.

7. The system product of claim 1, said operations further comprising:
pausing said generating after said inserting; and
continuing said generating said converted text after said segment.

8. A computer-implemented method, said computer-implemented method comprising:
receiving an audio file;
analyzing said audio file to produce an analysis;
generating a converted text from said analysis;
obtaining a text file, wherein said text file is related to said audio file, and wherein said text file is a known text;
comparing said audio file to a segment of said text file;
determining a portion of said audio file is similar to said segment of said text file by comparing a similarity to a similarity threshold, wherein said similarity is measured based on a percentage of words in portion of said audio file that match said segment of said text file;
deducing a first terminal signal in said audio file based on said similarity, wherein said first terminal signal identifies a first portion terminal end of said portion of said audio file;
identifying a first terminal tag in said text file, wherein said first terminal tag identifies a first segment terminal end of said segment of said text file;
corresponding said first terminal signal in said audio file to said first terminal tag in said text file; and
inserting said segment into said converted text, wherein said first terminal tag is aligned with said first terminal signal.

9. The computer-implemented method of claim 8, further comprising:
correlating said portion to said segment to deduce said first terminal signal.

10. The computer-implemented method of claim 8, further comprising:
deducing a second terminal signal, wherein said second terminal signal identifies a second terminal end of said audio file; and
matching said second terminal signal to a second terminal tag in said text file.

11. The computer-implemented method of claim 8, further comprising:
receiving said first terminal signal from a user.

12. The computer-implemented method of claim 8, further comprising:
compiling said text file and said audio file into a media file.

13. The computer-implemented method of claim 12, further comprising:
streaming said media file to a user.

14. The computer-implemented method of claim 8, wherein:
inserting said segment into said converted text includes replacing a section of said converted text corresponding with said portion.

15. The computer-implemented method of claim 8, further comprising:
pausing said generating after said inserting; and
continuing said generating said converted text after said segment.

16. A computer-implemented method, said computer-implemented method comprising:
receiving an audiovisual content including video content, original text content, and audio content, wherein said original text content is a known text;
applying natural language processing to convert a first audio portion of said audio content to a first converted text portion of natural language processing text;
determining said first converted text portion of said natural language processing text is similar to an original text portion of said original text content by comparing a similarity to a similarity threshold, wherein said similarity is measured based on a percentage of words in said first converted text portion that match said original text portion;
deducing a first terminal signal in said audio content based on said similarity, wherein said first terminal signal identifies a first portion terminal end of said portion of said audio content; and
replacing said first converted text portion of said natural language processing text with said original text portion of said original text content.

17. The computer-implemented method of claim 16 further comprising:
comparing said audio content to a segment of said original text content;
identifying a first terminal tag in said original text content, wherein said first terminal tag identifies a first segment terminal end of said segment of said original text content; and
corresponding said first terminal signal in said audio content to said first terminal tag in said original text content;

wherein said determining a portion of said natural language processing text is similar to a portion of said original text content based on a similarity threshold.

18. The computer-implemented method of claim 17, further comprising:
   aligning said first terminal tag with said first terminal signal;
   wherein said replacing said first converted text portion of said natural language processing text is based on said aligning said first terminal tag with said first terminal signal.

19. The computer-implemented method of claim 17 further comprising:
   correlating said portion of said audio content to said segment of said original text content to deduce said first terminal signal.

20. The computer-implemented method of claim 17 further comprising:
   receiving said first terminal signal from a user.

* * * * *